Nov. 30, 1965  A. C. TEAGO  3,220,564
MECHANICAL HANDLING APPARATUS
Filed Jan. 24, 1962  4 Sheets-Sheet 1

INVENTOR
ANTONY CHARLES TEAGO

BY Dicke and Craig
ATTORNEY

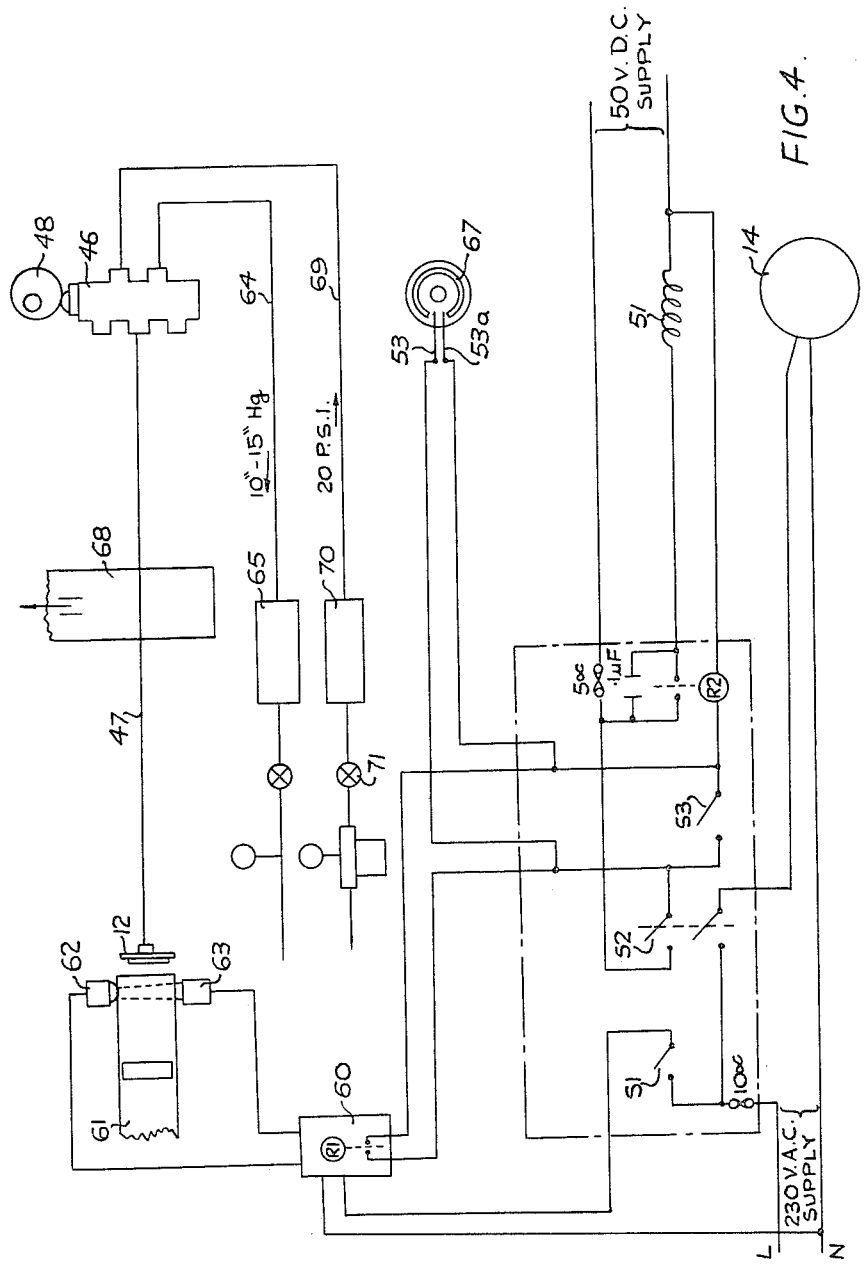

United States Patent Office 3,220,564
Patented Nov. 30, 1965

3,220,564
MECHANICAL HANDLING APPARATUS
Antony Charles Teago, Whitehall Orchard, Ifield, Crawley, Sussex, England
Filed Jan. 24, 1962, Ser. No. 168,482
Claims priority, application Great Britain, Feb. 1, 1961, 3,843/61
4 Claims. (Cl. 214—1)

This invention relates to mechanical handling apparatus. Although especially concerned with the handling of bricks, it is by no means so limited.

In its broadest aspect the invention provides apparatus for handling articles comprising a gripper for picking up one or more articles, means for twisting the gripper with the article or articles held thereon about a longitudinal axis through 90° and means for moving the gripper from a first position in which the article or articles are picked up and a second position in which they are released.

Preferably the twisting takes place during movement of the gripper between said two positions.

According to a feature of the invention means may also be provided for turning the gripper through 180° about a transverse axis.

From a more specific aspect the invention provides apparatus for handling bricks which comprises a framework, a vacuum head mounted thereon for picking up one or more bricks disposed on their faces, means for turning the head with the brick or bricks held thereon through 90° about the longitudinal axis of the bricks and traversing means on the framework for moving the head between the picking up position and a release position spaced apart therefrom.

The head is preferably mounted on a sleeve which is reciprocable along a rod mounted on the framework, and the turning is effected by means of a roller carried at the end of a cranked arm mounted on the head and pivotally attached to the sleeve, which roller is guided during movement of the sleeve along the rod into a recess in the framework.

The means for turning the head through 180° conveniently comprise a pinion mounted on the head and a rack, mounted on the framework, which is engageable thereby during movement of the head between the two positions. The rack is preferably displaceable between a position in which such engagement takes place and a position in which there is no engagement.

Figure 1:
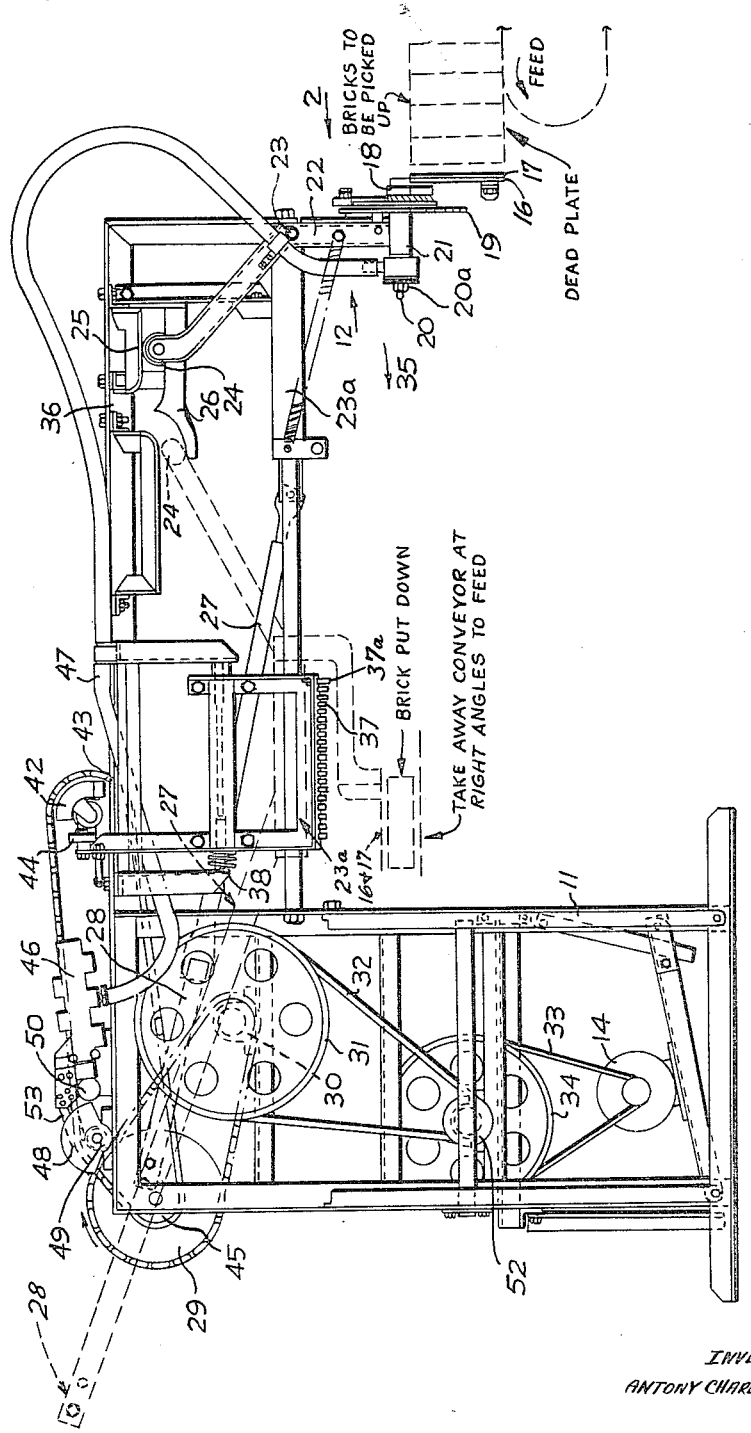
Figure 2:
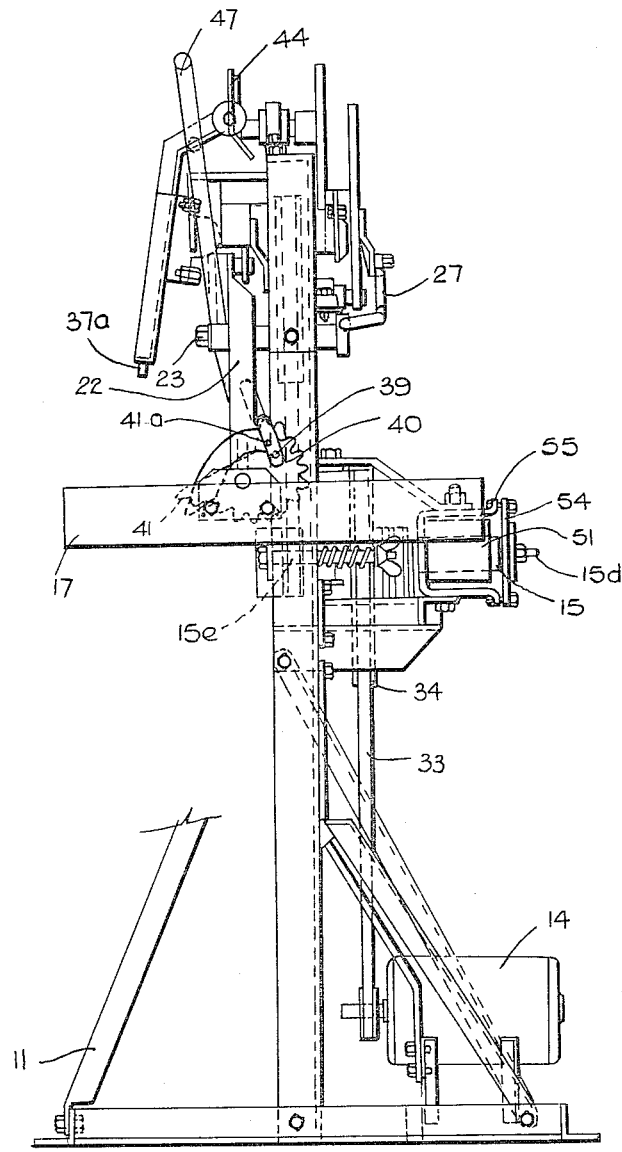
Figure 3:
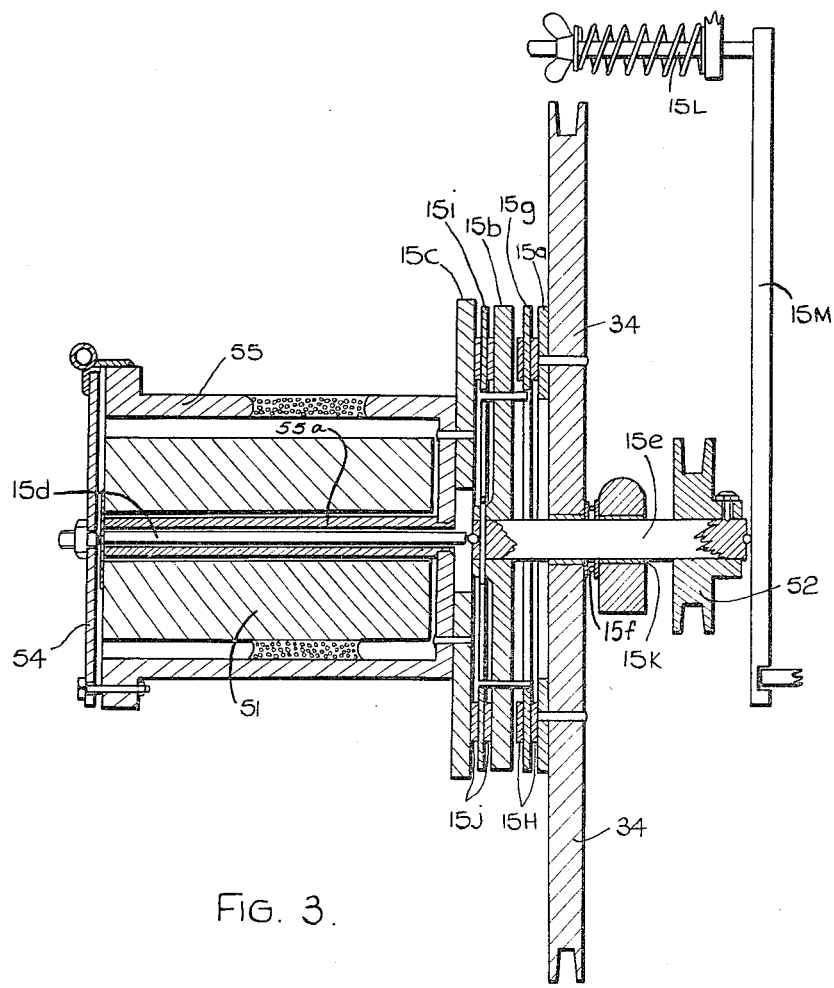

The following is a description by way of example of one specific embodiment of the invention. Reference is made to the accompanying drawings in which:

FIGURE 1 is a side elevation;
FIGURE 2 is a view in the direction of arrow 2 in FIGURE 1;
FIGURE 3 is a detailed sectional view of a brake/clutch assembly; and
FIGURE 4 is a diagram illustrating the electrical and pneumatic circuits.

Basically, the apparatus comprises a framework 11, which supports a pickup head assembly generally indicated at 12 which is reciprocable along a rod 13 carried by the framework 11, an electric motor 14, a solenoid operated brake/clutch assembly 15 and the various sprockets and pulleys for driving the parts of the apparatus. These individual components will be described hereinafter in greater detail.

In the position shown in FIGURES 1 and 2 the machine is in a position where it is ready to pick up bricks. In the actual "start" position, the pickup head is slightly retracted from the position shown. For the purpose of the following description it is to be assumed that the pickup head has actually engaged a pair of bricks.

The pickup head assembly 12 comprises a plate 16 having on its face a layer of deformable material 17 defining two individual surrounds each corresponding to the size of a brick face. At the back of the plates 16 there is attached a plate 18 carrying a sprocket 19 and a spindle, the end of which is shown at 20, which extends through a sleeve 21. A nut 20a is provided which secures the pickup head assembly for rotation about the axis of the sleeve 21. The sleeve is carried by a cranked arm 22 pivotally mounted at 23 on a sleeve 23a which is reciprocable along the rod 13 by means hereinafter to be described. At the other end of the arm 22 a roller 24 is provided which, in the position shown in FIGURE 1, is seated between guide members 25 and 26. Reciprocation of the sleeve 23a (and thus the whole pickup head assembly) is effected by a connecting rod and crank assembly 27, 28 the rod being connected at one end to the sleeve 23a and the crank being secured to a sprocket 29. The sprocket 29 is chain driven by a sprocket 30 connected to a pulley 31 driven by a belt 32 from the brake/clutch assembly 15 to which drive is imparted from the motor 14, through a belt 33 and pulley 34. Details of the brake/clutch will be given hereinafter. As the pickup head assembly is moved in the direction of the arrow 35 of FIGURE 1, the roller 24 is guided by the surface 26 into a recess 36. The result of this is that the arm 22 pivots about the pivot point 23 and the end of the pickup head assembly is turned through 90°—i.e. the bricks which were previously disposed with their faces in a vertical plane are now disposed with their faces in a horizontal plane.

In certain cases it is desirable to "face" the bricks and this means that every second pair of bricks has to be turned about a transverse axis through 180°. This is achieved as follows: When the pickup head assembly has been turned through 90° the pinion 19 is in such a position that as the sleeve 23a is moved farther in the direction of the arrow 35 it will engage a rack 37 pivotally mounted at 38 on the framework 11. Engagement of the individual teeth of the pinion with the rack results in the required turning movement. It will be observed that the first pin of the rack is longer than the remainder. The purpose of this is to engage a locking mechanism for the pickup head. This locking mechanism comprises a pin 39 mounted on a lever 41 pivoted at 41a and engageable in a spring loaded fork 40. The lever 41 engages the first pin 37a of the rack so as to release the pin 39 from the fork 40 allowing rotation of sprocket 19. As mentioned before, this twisting of the pickup head through 180° only takes place every other stroke of the machine. The rack normally lies in a position where it will not be engaged by the sprocket 19. In order to bring it into line for engagement, means are provided comprising a cam surface 42 mounted on a sprocket 43 for engagement with a roller 44 mounted on the framework carrying the rack. The sprocket 43 is chain driven from a sprocket 45 mounted on the same shaft as the sprocket 29. The size of the sprockets 43 and 45 are so chosen that the speed of rotation of the cam surface 42 is such that engagement with the roller 44 only takes place every other stroke.

The vacuum to the pick-up head is delivered from a valve 46 (connected to a vacuum reservoir 65) (see FIGURE 4) through a pipeline 47 and through the centre spindle of the pickup head. The valve 46 is controlled by a cam 48 on a sprocket 49 chain driven by the sprocket 45. In the position shown in FIGURE 1 the cam 48 has just engaged the wheel 50 of the valve 46 and the vacuum is applied to the pickup head. The speed of rotation is such that when the pickup head reaches the end of its stroke in the direction of the arrow 35, the wheel 50 is released, the vacuum supply cut off and the bricks deposited. It has been found that there is a tendency for loose material to adhere to the pickup head and thus impair the efficiency of the vacuum and means are provided for blowing compressed air through the pickup head immediately after the vacuum has been cut off and the bricks deposited. To this end the valve 46 is connected not only to the vacuum reservoir 65 but also to a compressed air reservoir 70. Pressure is built up in the reservoir from a regulated supply of compressed air which is bled into the reservoir through a needle valve 71 (FIGURE 4). Immediately the vacuum supply is switched off by disengagement of the cam 48 with the wheel 50, the supply line 47 is opened to the reservoir 70 and compressed air is blown through the pickup head. The pickup head thereafter remains open to atmosphere until the end of its return stroke and the beginning of a new stroke when the cam 48 again engages the wheel 50. As the stroke of the pickup head is being completed, pressure is again built up in the reservoir and that pressure is sufficient to provide the flow of compressed air through the pickup head after the bricks have been deposited.

The brake/clutch assembly is shown in detail in FIGURE 3. The drive to the various components of the machine is derived from an electric motor 14 and driving pulley 34 on which a clutch driving plate 15a is mounted. The pulley 34 is free to rotate and slide on a shaft 15e. When the solenoid 51 is energized by means hereinafter to be described, the armature plate 54 is attracted to the iron yoke 55 and hollow core 55a and a push rod 15d engaging the plate 54 is moved inwards engaging the end of the shaft 15e carrying the driving pulley 52 and rotating in and sliding through a bearing 15f. The driven plate 15b attached to shaft 15e is moved towards driving plate 15a and a floating plate 15g carrying friction linings 15h on both faces is compressed between plates 15a and 15b imparting drive from the former to the latter and thus drive from pulley 34 to pulley 52, pulley 34 being separated from pedestal bearing 15k by a ball race 15f. At the same time sliding movement of shaft 15e moves plate 15b away from a plate 15c which is rigidly attached to yoke 55 and thus to the frame 11 of the machine, and a floating plate 15i carrying friction linings 15j is freed. Movement of rod 15e also compresses a spring 15l hereinafter referred to.

When the solenoid 51 is de-energised the plate 54 is released, push rod 15d is pushed outwards by shaft 15e which is returned to its original position by pressure of the spring 15l applied through a brake lever 15m so that the driven plate 15b moves away from the driving plate 15a releasing the floating plate 15g and compressing the floating plate 15i against the fixed plate 15c; thus the drive from the pulley 34 is no longer applied to the pulley 52 but a breaking effect from the plate 15c is produced.

As the bricks approach the position for pick up they cut a beam directed from a light source 62 onto a photoelectric cell 63, thus providing a signal which energises the solenoid 51 by means hereinafter described. As far as the deenergisation is concerned, a pair of contacts 53 and 53a are provided which engage a contact surface 67 on the cam 48 and make the circuit. During the stroke of the rotation of the cam 48 contact is maintained. A break is made however just before the end of the stroke, i.e. just before a further pair of bricks is picked up and the solenoid deenergised with the result that drive is no longer imparted to the pulley 31.

With regard to the cycle of operation of the machine and the electrical and pneumatic control particular reference will be made to FIGURE 3 of the accompanying drawings. In this diagrammatic drawing the machine is shown switched off, i.e. the valve 46 is closed to both air and vacuum, the contact fingers 53 and 53a are out of contact with the contact surface 67 and the solenoid 51 of the clutch/brake assembly 15 is deenergised, i.e. the brake is on.

In the electrical circuit there are three hand-operable switches S1, S2 and S3. For one mode of automatic operation these switches are set as follows:

S1 is closed—A.C. supply is available to photoelectric cell control box 60.
S2 is closed—the motor 14 is on and D.C. supply is available to contact fingers 53 and the contacts of a relay R1.
S3 is open.

*Operation*

As a brick on supply conveyor 61 approaches the pickup head 12 it breaks a beam of light between the source 62 and the cell 63. This causes energisation of relay R1 which in its turn causes energisation of relay R2. Energisation of relay R2 energises the solenoid 51 which releases the brake and engages the clutch of the brake/clutch assembly. Thus the motor starts to drive the machine and through the rod and crank assembly 27, 28 the pickup head moves towards the brick on the conveyor 61. At the same time the cam 48 is rotated. It engages the valve 46 and the pickup head 12 is connected by lines 47, 64 to vacuum reservoir 65. At the same time contact is made between the fingers 53 and 53a through the surface 67 and the circuit which energises relay R2 (and hence the solenoid 51) is maintained when relay R1 is deenergised.

The pickup head engages the brick and picks it up and the head with the brick held to it is moved, as hereinbefore described, to a position over a conveyor 68. As the brick is removed the beam between source 62 and cell 63 is remade and relay R1 deenergised.

By the time the brick is properly positioned over the conveyor 68 the cam 48 has moved to a position to operate the valve 46 again, cutting off the vacuum supply and connecting the head by pipes 47, 69 to air reservoir 70 for the purpose hereinbefore described.

The pickup head then returns to its "start position," the valve 46 is returned to its original position and both air and vacuum are shut off, and contact between fingers 53 and 53a is broken. This results in de-energisation of relay R2, and consequent deenergisation of the solenoid 51 so that the brake is applied.

The machine is thus stopped and remains in this position until a further brick breaks the beam and the whole cycle is repeated.

As well as the automatic operation just described it is possible to control the machine manually. To this end the switches S1, S2 and S3 are set as follows:

S1 is open.
S2 is closed—the motor is on and D.C. supply is available to contact fingers 53 and the contacts of the relay R1.
S3 is closed—the relay R2 is continuously energised and hence the solenoid 51 continuously energised.

The sequence of operation of the machine is the same as that of the automatic operation save that as the solenoid 51 is continuously energised the machine will run continuously irrespective of the presence of a brick until switch S3 is opened. When switch S3 is opened the machine completes a cycle but stops when the start position is reached (contact is broken between fingers 53 and 53a) and relay R2 and solenoid 51 are deenergised. Thus by appropriate operation of switch S3 the machine may be controlled to carry out one or more complete cycles.

It will be appreciated that the machine described above is easily adaptable to a variety of uses. Thus, in a very simple form it could be used to pick up bricks and deposit them at spaced intervals without the disposition of the bricks being changed. Further there is no need for the bricks to be turned through 180° on alternate strokes; they may be turned at any predetermined time or not at all or for that matter may be turned on each stroke.

It is also to be understood that although the particular apparatus described is intended essentially for the transportation of bricks the invention is by no means so limited. It will be appreciated that the apparatus will readily lend itself to the transfer of any sort of article which is grippable by vacuum from one location to another and also enables a change in the disposition of the article during that transference.

I claim:

1. Apparatus for handling bricks which comprises a framework, a vacuum head mounted thereon for picking up brick means disposed on their faces, means for turning the head with said brick means held thereon through 90° about an axis parallel to the longitudinal axis of said brick means and traversing means on said framework for moving the head between a position in which said brick means is picked up and a position in which said brick means is released, said head being supported by means including a sleeve which is reciprocable along a rod mounted on said framework, said last-named means further including movable means, and a pivotal connection on said sleeve pivotally supporting said movable means, means controlling said vacuum head for rendering said vacuum head effective to pick up and to release said brick means, means being provided for turning the head through 180° about a transverse axis.

2. Apparatus according to claim 1, in which said means comprise a pinion mounted on the head and a rack, pivotally mounted on the framework, said rack being adapted for engagement by said pinion during movement of the head between the two positions.

3. Apparatus according to claim 2, in which means are provided to displace said rack between a position in which such engagement takes place and a position in which there is no engagement.

4. Apparatus for transferring brick means from a first moving conveyor to a second moving conveyor, said first conveyor delivering a constant supply of said brick means to said apparatus, said apparatus comprising a stationary framework, a vacuum head supported by said framework for picking up said brick means, traversing means on said framework for moving said head from a first position to a second position, said first position being adjacent said first moving conveyor, said brick means being picked up by said vacuum head from said first moving conveyor when said head is in said first position, said second position being adjacent said second moving conveyor and in which second position said brick means is released for reception thereof by said second moving conveyor, means for turning said vacuum head with said brick means held thereon through an angle of 90° about a horizontal axis spaced from said vacuum head, said means for turning comprising means operable in response to operation of said traversing means, and control means for said vacuum head enabling said vacuum head to pick up and to release said brick means in said first and second positions, respectively.

References Cited by the Examiner

UNITED STATES PATENTS

| 1,222,535 | 4/1917 | Crum. |
| 1,959,216 | 5/1934 | Owen. |
| 2,049,850 | 8/1936 | Lytle. |
| 2,693,872 | 11/1954 | Baader _____ 198—33.2 |
| 2,710,696 | 6/1955 | Fontaine. |
| 2,899,043 | 8/1959 | Young. |
| 2,980,265 | 4/1961 | Johnson. |

FOREIGN PATENTS 889,423 9/1953 Germany.

HUGO O. SCHULZ, *Primary Examiner.*

MORRIS TEMIN, *Examiner.*